(12) United States Patent
Kumar et al.

(10) Patent No.: US 10,728,311 B2
(45) Date of Patent: Jul. 28, 2020

(54) DEVICE, SYSTEM AND METHOD FOR ADAPTIVE PAYLOAD COMPRESSION IN A NETWORK FABRIC

(71) Applicant: Intel Corporation, Santa Clara, CA (US)

(72) Inventors: Karthik Kumar, Chandler, AZ (US); Francesc Guim Bernat, Barcelona (ES); Thomas Willhalm, Sandhausen (DE); Nicolas A. Salhuana, Tempe, AZ (US); Daniel Rivas Barragan, Cologne (DE)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 15/434,726

(22) Filed: Feb. 16, 2017

(65) Prior Publication Data
US 2018/0234486 A1 Aug. 16, 2018

(51) Int. Cl.
*H04L 29/08* (2006.01)
*H04L 29/06* (2006.01)
*G06F 15/16* (2006.01)

(52) U.S. Cl.
CPC .............. *H04L 67/10* (2013.01); *H04L 65/80* (2013.01); *H04L 69/04* (2013.01); *H04L 69/24* (2013.01); *H04L 67/42* (2013.01)

(58) Field of Classification Search
USPC ......................................... 709/223, 239, 212
See application file for complete search history.

(56) References Cited

U.S. PATENT DOCUMENTS

| | | | |
|---|---|---|---|
| 5,258,963 A | 11/1993 | Lane et al. | |
| 6,484,225 B2 * | 11/2002 | Sheikh | G06F 13/4022 710/309 |
| 7,068,599 B1 | 6/2006 | Jiang et al. | |
| 2006/0224727 A1 | 10/2006 | Kumakura et al. | |
| 2011/0216651 A1 * | 9/2011 | Bansal | H04L 47/20 370/235 |
| 2014/0258438 A1 * | 9/2014 | Ayoub | G06F 13/28 709/212 |

(Continued)

*Primary Examiner* — Jude Jean Gilles
(74) *Attorney, Agent, or Firm* — Patent Capital Group

(57) ABSTRACT

A computing device, method and system to implement an adaptive compression scheme in a network fabric. The computing device may include a memory device and a fabric controller coupled to the memory device. The fabric controller may include processing circuitry having logic to communicate with a plurality of peer computing devices in the network fabric. The logic may be configured to implement the adaptive compression scheme to select, based on static information and on dynamic information relating to a peer computing device of the plurality of peer computing devices, a compression algorithm to compress a data payload destined for the peer computing device, and to compress the data payload based on the compression algorithm. The static information may include information on data payload decompression supported methods of the peer computing device, and the dynamic information may include information on link load at the peer computing device. The compression may further take into consideration QoS requirements of the data payload. The computing device may send the data payload to the peer computing device after compressing.

25 Claims, 8 Drawing Sheets

(56) References Cited

U.S. PATENT DOCUMENTS

2015/0319081 A1* 11/2015 Kasturi ................ H04L 49/355
                                                    709/239
2016/0277214 A1*  9/2016 Guntaka ............... H04L 45/745

* cited by examiner

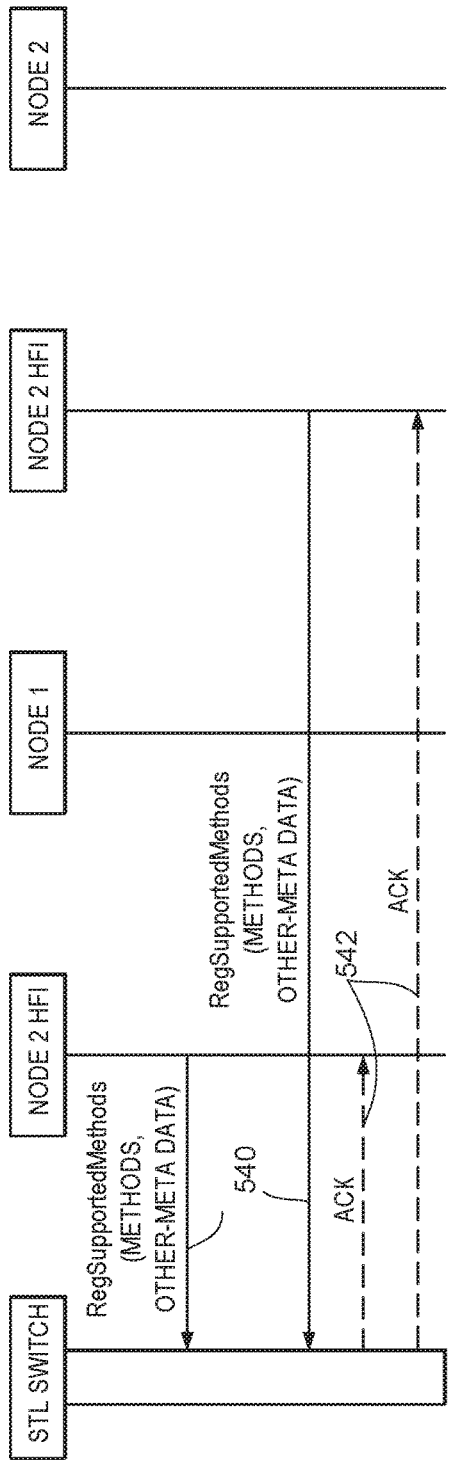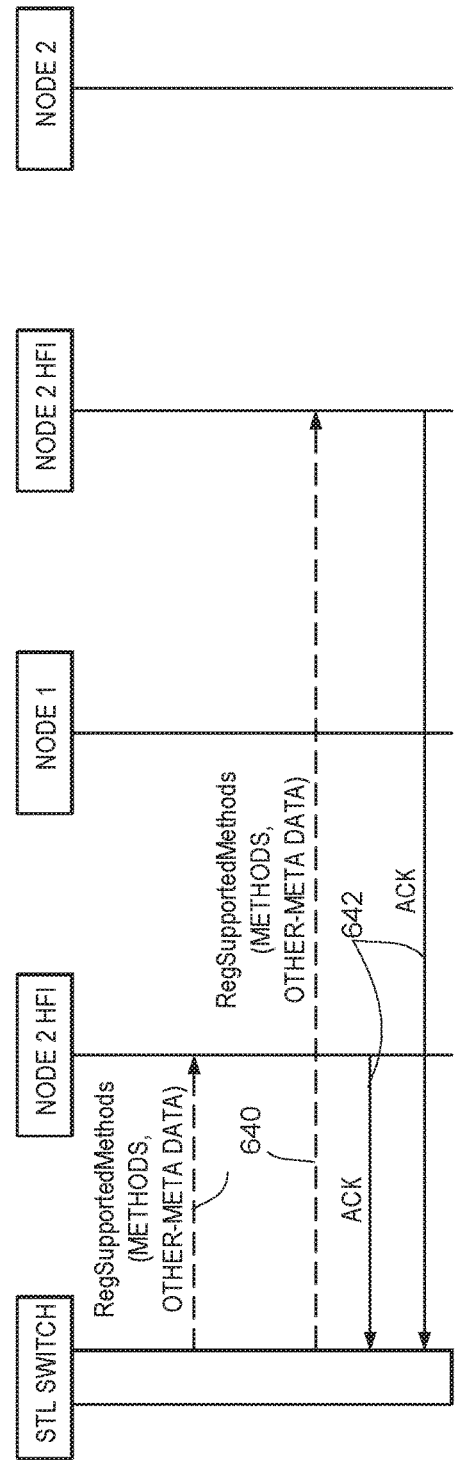

DEVICE, SYSTEM AND METHOD FOR ADAPTIVE PAYLOAD COMPRESSION IN A NETWORK FABRIC

FIELD

The present disclosure relates in general to data processing systems, and in particular to distributed data processing systems involving nodes and switches in a network fabric.

BACKGROUND

The datacenter is experiencing an emerging trend characterized by an exponential increase in the volume of data to be communicated not only among processors within a node, but also between nodes within a network fabric. The above is even more significant to the extent that memory usage is being increasingly distributed across multiple nodes to dramatically increase data storage capacity. There exists a tension between the increasing volume of data to be held in distributed memory within the network fabric, and the need for maintaining an acceptable data rate for data payload communication between nodes and through switches.

BRIEF DESCRIPTION OF THE DRAWINGS

FIG. 5 illustrates an example fabric flow with respect to sending static information from nodes to a switch according to some demonstrative embodiments;

FIG. 6 illustrates an example fabric flow with respect to sending static information from a switch to nodes according to some demonstrative embodiments;

Like reference numbers and designations in the various drawings indicate like elements.

DETAILED DESCRIPTION

Figure 1:
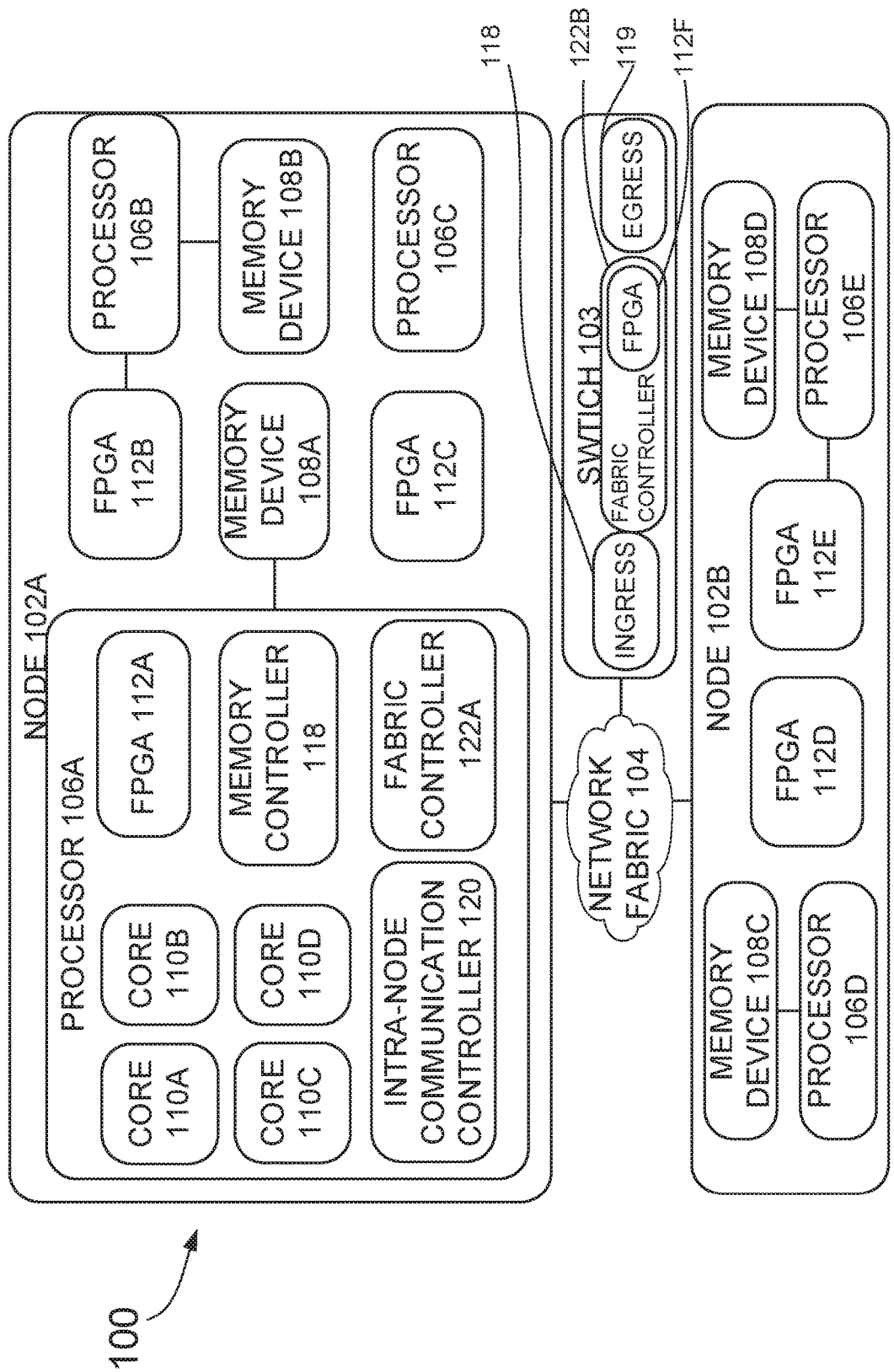
FIG. 1 illustrates a block diagram of a portion of a fabric network includes computing devices such as nodes and a switch, in accordance with some demonstrative embodiments.

In a datacenter, where memory usage is distributed across a variety of nodes to enable large volumes of data to be held in memory, bandwidth intensive memory operations are needed. At a node level, such bandwidth requirements are relatively high. For example, it could take a memory bandwidth of about 150 GB/s to operate on memory in a two-socket platform, and of about 400 GB/s in a four-socket platform in a given node. At a datacenter level, however, one would move to a bandwidth requirement of 1000's of Gigabits per second for communication between nodes in a network fabric and away from the central processing unit (CPU)-memory pathway. For example, usages such as in-memory online analytics processing (OLAP) tend to be very bandwidth intensive with little coherence traffic. In a datacenter scenario, a current and projected ability to transmit is at a bandwidth of 100's of Gigabits per second between nodes, for example at 100 or 200 Gigabits per second, such as about 12-24 GigaBytes per second on the link.

Operations such as OLAP that use in-memory computing to scale the data communication to the datacenter level attempt to address the need to transfer large volumes of data at acceptable data rates. For example, one may increase the data rate through using improved interconnect technologies, or one may reduce a volume of data to be transferred, in order to achieve optimal data transfer in a datacenter setting. Network accelerators currently exist, such as in a Peripheral Component Interconnect (PCI) Express (PCI-E) form factor, or in a Central Processing Unit (CPU) chipset, that employ compression and decompression schemes such as, for example, the open-source file compression program "bzip", "bzip2" or "gzip." However, known zip compression techniques tend to have an average data volume compression ratios of between about 10% to about 30% depending on the type of data being compressed, and are far from achieving a 10× compression currently needed.

Large lossless compression algorithms/schemes that typically yield compression ratios of between about 10× and 20× are known, and typically use a combination of techniques more sophisticated than known zip techniques such as the ones mentioned above. For example, techniques involving Golomb coding may be combined with bit-packing techniques to achieve the large lossless compression ratios mentioned above. An example of such a combination may be found through the use of two compression techniques such as dictionary encoding (using mostly column encoding) combined with run-length encoding. It is worth noting that use of such techniques does involve overhead on the CPU, as look-up tables would need to be constructed to allow the encoding, and the tables would need to be bit-packed to allow compression. The above can however, be achieved using mask and shuffle operations on very wide vector registers, such as, for example, a 256-bit or a 512-bit AVX-512/AVX3 register. The latter would allow the alignment of bit-packed data to 32-bit granularity to allow a processing of the data, including operating on the data and unpacking the same. A combination of dictionary encoding and run-length encoding as mentioned here is only an example, however. A skilled person would know a range of encode-and-bit-pack techniques that would offer trade-offs between optimizing the use of computer resources and communication at the same time.

In the description to follow, a computing device's "peer computing device" refers to a node or a switch participating in the same network fabric as the computing device. A "sender" refers to any computing device within the network fabric sending one or more data payloads, and a "target" refers to any computing device within the network fabric that is to be the recipient of a data payload.

Considering large lossless compression techniques that are at one's disposal within the datacenter environment, a problem arises as to when and how to use such techniques in an effective manner toward optimizing both the use of computational resources and the rate and quality of the data communication. For example: (1) one may not always wish to use any compression technique in certain instances; (2) one may wish for a sender to be able to select between various ones of such techniques, for example factoring in network congestion/load on the receiver side; (3) one may wish for a sender to determine whether and which compression technique is used at a specific part of the transmission of a data payload within a network fabric; (4) one may wish to allow decompression prior to a data payload reaching a target, for example at a switch, especially when the target may be experiencing high link loads; (5) one may wish to ensure that the sender is always aware of compression algorithms that are supported at the target, which would avoid node architecture heterogeneity where the sender may support compression algorithms A and B, while the target may only support compression algorithms C and D.

Figure 2:
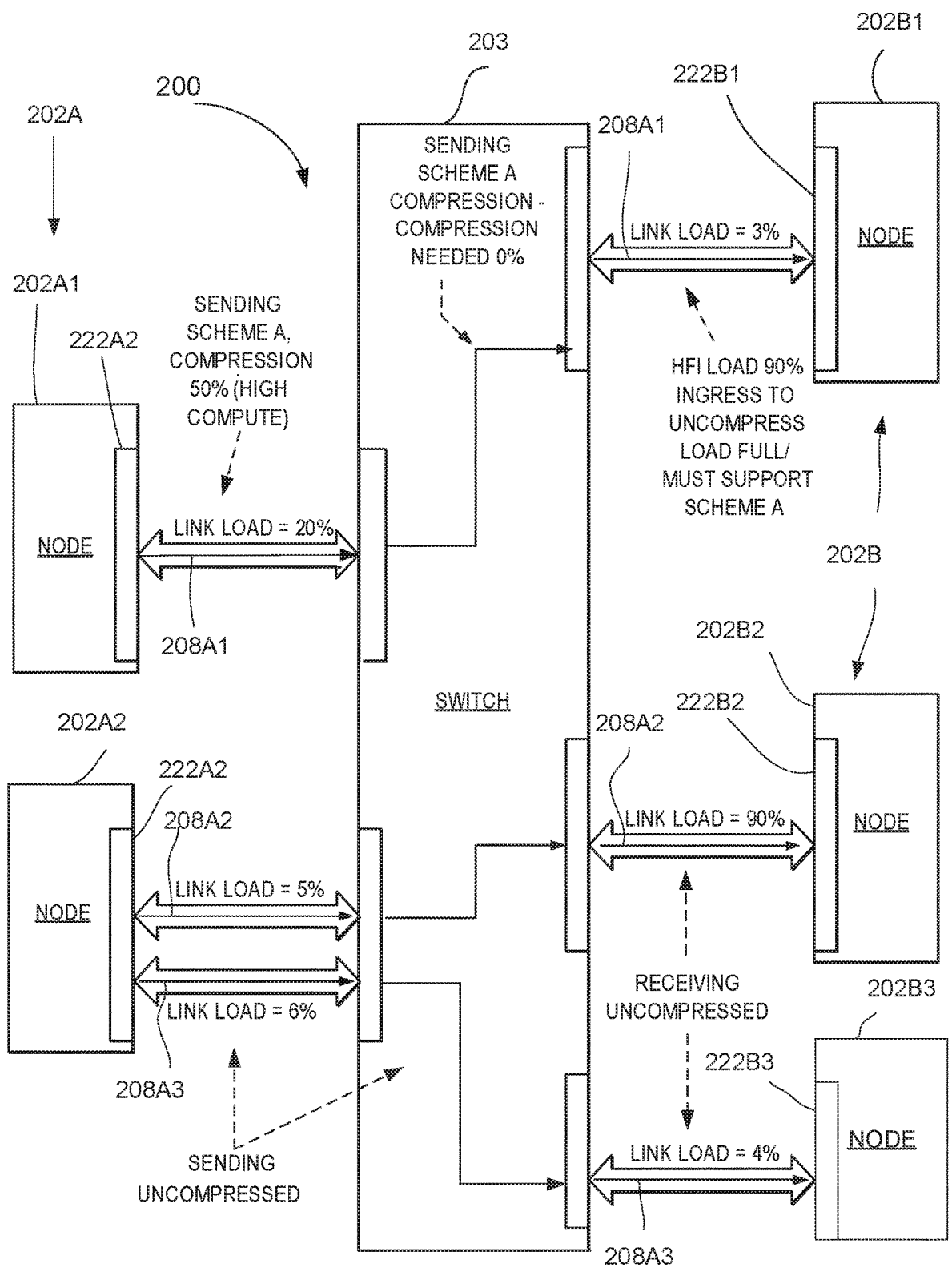
FIG. 2 illustrates a portion of a fabric network including a set of sender nodes in the process of sending data payloads to target nodes through a switch.
Figure 3:
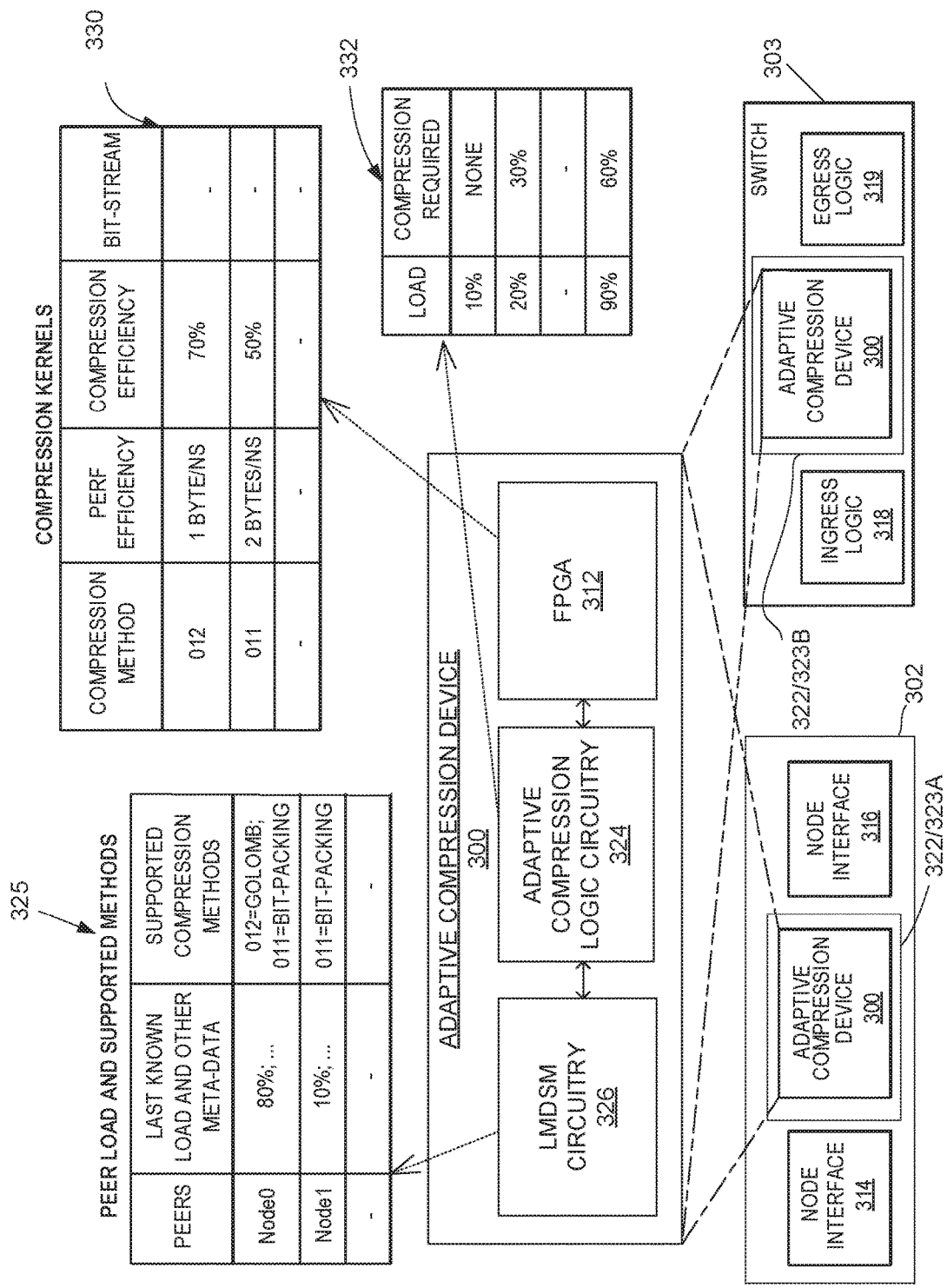
FIG. 3 illustrates an architecture of an Adaptive Compression Device of a computing device according to demonstrative embodiments, along with associated compression kernels and associated meta data.

FIGS. 1, 2 and 3 illustrate block diagrams of systems and components adapted to be used in the context of some demonstrative embodiments, as will be explained in further detail below.

In particular, FIG. 1 illustrates a block diagram of a portion of a network fabric including computing devices such as nodes 102. (102A and 102B), and a switch 103, in accordance with certain embodiments. Although only two nodes 102A and 102B and only one switch 103 are shown in FIG. 1, network fabric 100 may include any suitable number of computing nodes 102 and switches 103 coupled to each other via a network fabric connections 104. Computing nodes 102 may implement any number of memory coherent domains. A node 102A or 102B may include any suitable number of processors 106 (106A, 106B, 106O, 106D and 106E), memory devices 108 (memory devices 108A, 108B, 108C and 108D), cores 110 (such as cores 110A, 110B, 110C and HOD), field programmable gate arrays FPGAs 112 (such as FPGAs 112A, 112B, 112C, 11.12D, 112E and 112F), controllers 118, 120, and 122 (122A and/or 122B), and/or other components. In embodiments, fabric controllers 122A and 122b may be incorporated with adaptive data payload compression technology, to be described more fully below. Network fabric 100 may represent any suitable computing environment, such as a high-performance computing environment, a datacenter, a communications service provider infrastructure (e.g., one or more portions of an Evolved Packet Core), an in-memory computing environment, another computing environment, or a combination thereof. The computing nodes 102 may be coupled together via a network fabric connections 104 (which may include a low latency interconnect fabric) to form the network fabric.

Switch 103 may include ingress logic 118 on a per node basis to receive and queue a data payload from an associated node, and egress logic 119 to queue the data payload after processing through for transmission from the switch.

Processors 106 may comprise any suitable processor, such as a microprocessor, an embedded processor, a digital signal processor (DSP), a network processor, a handheld processor, an application processor, a co-processor, a system on a chip (SOC), or other device to execute code (i.e., software instructions). Processor 106, in the depicted embodiment, includes four processing elements (e.g., cores 110A-110D), which may include asymmetric processing elements or symmetric processing elements. However, a processor or processing circuitry may include any number of processing elements that may be symmetric or asymmetric. A processing element may refer to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads. Processing elements may also include one or more arithmetic logic units (ALUs), floating point units (FPUs), caches, instruction pipelines, interrupt handling hardware, registers, or other hardware to facilitate the operations of the processing elements.

A computing node 102 or switch 103 according to embodiments may comprise any number of FPGAs 112. An FPGA may be a semiconductor device that may include configurable/reprogrammable logic circuitry. An FPGA may be programmed via a data structure (e.g., a bit-stream) having any suitable format that defines how the logic is to be configured. An FPGA may be reprogrammed any number of times after the FPGA is manufactured. The configurable logic of an FPGA 112 may be programmed to implement one or more kernels. A kernel may comprise configured logic of the FPGA that may receive a set of one or more inputs, process the set of inputs using the configured logic, and provide a set of one or more outputs. The kernel may perform any suitable type of processing. In various embodiments, a kernel may comprise a video processor, an image processor, a waveform generator, a pattern recognition module, a packet processor, an encryptor, a decryptor, an encoder, a decoder, a compression device, a processor operable to perform any number of operations each specified by a distinct instruction sequence, or other suitable processing function. Some FPGAs 112 may be limited to implementing a single kernel at a time while other FPGAs may be capable of implementing multiple kernels simultaneously.

Any suitable entity of a computing node 102 may program an FPGA 112 to implement one or more kernels (i.e. may register one or more kernels at an FPGA) and/or to execute the one or more kernels (i.e., to provide one or more input parameters to the FPGA and instruct the FPGA to perform the functions of the kernel based on the input parameters). For example, a core 110, an intra-node communication controller 120, or a fabric controller 122 may directly (or indirectly through another component) register a kernel to an FPGA or instruct the FPGA to execute a kernel. In particular embodiments, an FPGA 112 may be connected to a core directly (e.g., if the FPGA is integrated with the processor as shown by FPGA 112A) or through an intermediary such as an I/O controller (e.g., the FPGA may be connected to the processor through a PCI Express (PCIe) connection).

A memory device 108 may store any suitable data, such as data used by processors 106 or FPGAs 112 to provide the functionality of network fabric 100. For example, data associated with programs that are executed or files accessed by cores 110 may be stored in memory device 108. Thus, a memory device 108 may include a system memory that stores data and/or sequences of instructions that are used or executed by the cores 110. In various embodiments, a memory device 108 may store persistent data (e.g., a user's files or instruction sequences) that remains stored even after power to the memory device 108 is removed. A memory device 108 may be dedicated to a particular processor 106 or FPGA 112 or shared with other devices (e.g., one or more other processors or other device) of network fabric 100. In various embodiments, a memory device 108 may include a memory comprising any number of memory modules, a memory device controller, and other supporting logic. A memory module may include a plurality of memory cells that are each operable to store one or more bits. The cells of a memory module may be arranged in any suitable fashion, such as in columns and rows or three dimensional structures. The cells may be logically grouped into banks, blocks, pages (wherein a page is a subset of a block), sub blocks, frames, word lines, bit lines, bytes, or other suitable groups. A memory module may include nonvolatile memory and/or volatile memory.

Memory controller 118 may be an integrated memory controller (i.e., it is integrated on the same die or integrated circuit as processor 106A) that includes logic to control the flow of data going to and from the memory devices 108. Memory controller 118 may include logic operable to read from a memory device 108, write to a memory device 108, or to request other operations from a memory device 108. In various embodiments, memory controller 118 may receive write requests from cores 110 and may provide data specified in these requests to a memory device 108 for storage therein. Memory controller 118 may also read data from a memory device 108 and provide the read data to an I/O controller or a core 110. During operation, memory controller 118 may issue commands including one or more addresses of the memory device 108 in order to read data from or write data to memory (or to perform other operations). In some embodiments, memory controller 118 may be implemented in a different die or integrated circuit than that of processor 106A.

Intra-node communication controller 120 may provide an interface for intra-node communication. Intra-node communication controller 120 may couple to an interconnect that provides a transportation path between two or more processors (or processor cores) and/or between a processor or core and an FPGA 112 that is local to the processor or core. In various embodiments, the interconnect may be a point-to-point processor interconnect, and the protocol used to communicate over the interconnect may have any suitable characteristics of Intel Ultra Path Interconnect (UPI), Intel QuickPath Interconnect (QPI), or other known or future intra-node communication protocol. In various embodiments, intra-node communication controller 120 may be a UPI agent, QPI agent, or similar agent capable of managing intra-node communications. In various embodiments, the same communication protocol used to communicate between processors 106 may be used for intra-processor communications, such as communications between a core 110 and an FPGA 112, a core 110 and a fabric controller 122, or between a fabric controller and an FPGA 112 integrated on a processor, or other intra-node communications, such as between a fabric controller 122 (that may or may not be integrated on a processor) and an FPGA that is not integrated on the processor (such as FPGA 112B, 1120 or 112D).

In a particular embodiment, one fabric controller 122, for example fabric controller 122A, may send data payloads over the network fabric connections 104 to another fabric controller 122B of a switch 103, or to another fabric controller 1220 of another node 102B. The fabric controller 122A may also receive, over the network fabric connections 104, data payloads, such as those provided in response to such requests, and provide the results to the requesting entity (e.g., a core 110). In embodiments, the data payloads sent and received may be adaptively compressed. Results may be stored in a memory device 108 for retrieval by the requesting entity. In a particular embodiment, requests communicated across the network fabric connections 104 connections by the fabric controllers 122 may include transport layer requests (e.g., requests according to Layer 4 or L4 of the Open Systems Interconnection model).

In various embodiments, fabric controller 122 may comprise processing circuitry including logic to process data and to communicate the data using any suitable physical layer and data link layer standard such as Ethernet (e.g., as defined by an IEEE 802.3 standard), Fibre Channel, InfiniBand, Intel Omni-Path Host Fabric Interface (HFI), or other suitable standard. Fabric controller 122 may include or be coupled to one or more physical ports that may couple to a cable (e.g., an Ethernet cable, Infiniband cable, QSFP28 cable, or other suitable cable).

In various embodiments, fabric controller 122 may comprise a host bus adapter InfiniBand host channel adapter), a network interface controller (e.g., an Ethernet controller), an HFI adapter, or other suitable controller operable to manage communication between a processor 106 and network fabric connections 104.

In various embodiments, fabric controller 122 may be integrated on the same die or integrated circuit as processor 106. In other embodiments, fabric controller 122 may be located off of the die (e.g., on a chip or card insertable into a socket or slot of node 102). In various embodiments, a fabric controller 122 may be dedicated to a single processor 106 or shared among multiple processors 106 of the same node 102. In a particular embodiment, the fabric controller 122 may interface directly with other components of processor 106. In another embodiment, the fabric controller 122 may interface with components of processor 106 through an I/O controller, such as that described below.

Network fabric connections 104 may include any suitable network connections operating using one or more suitable networking protocols. Network fabric connections 104 may represent a series of interconnected communication paths for receiving and transmitting packets of information. In various embodiments, network fabric 100 including network fabric connections 104 may include a switched fabric which connects any number of fabric controllers 122 of various nodes 102 or switches 103 via one or more network switches (e.g., crossbar switches). In various embodiments, network fabric connections 104 may provide point-to-point connectivity between the fabric controllers 122. In particular embodiments, network fabric connections 104 may be physically co-located with computing nodes 102. For example, the computing nodes 102 and network fabric connections 104 may be located in the same rack or chassis, or within the same physical building.

Network fabric connections 104 may comprise any suitable network fabric, such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable network fabric. In other embodiments, network fabric connections 104 may comprise any other suitable board-to-board or chassis-to-chassis interconnect.

Although not depicted, in various embodiments; processor 106 may include or be coupled to one or more I/O controllers that include logic for communicating data between processor 106 and I/O devices, which may refer to any suitable devices capable of transferring data to and/or receiving data from an electronic system, such as a processor 106. For example, an I/O device may be a fabric controller 122; an FPGA 112; an audio/video (AN) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or another suitable device.

An I/O device may communicate with an I/O controller of the processor 106 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various embodiments, I/O devices coupled to the I/O controller may be located off-chip (i.e., not on the same integrated circuit or die as processor 106) or may be integrated on the same integrated circuit or die as the processor 106.

Although not depicted, network fabric 100 may use a battery, renewable energy converter (e.g., solar power or motion-based energy), and/or power supply outlet connector and associated system to receive power, a display to output data provided by one or more processors 106, or a network interface allowing the processors 106 to communicate over a network. In various embodiments, the battery, power supply outlet connector, display, and/or network interface may be communicatively coupled to processors 106.

The components of a node 102 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, a Gunning transceiver logic (GU) bus, or other type of interconnect.

Reference is now made to FIG. 2, which depicts a portion of a network fabric 200 similar to network fabric 100 of FIG. 1, including a set of nodes 202A in the process of sending data payloads, a network switch 203 routing the data payloads from nodes/senders 202A to nodes/targets 202B. The nodes, switch and network fabric of FIG. 2 may be similar to the nodes 102, switch 103 and network fabric 100 described above in relation to FIG. 1. Each node/sender 202A is shown as having a fabric controller 222A (including 222A1 and 222A2), and each node/target 202B is shown as having a fabric controller 222B (including 222B1, 222B2 and 222B3). The fabric controllers 222A and 222B may, for example, each include an HFI as shown. In the shown system, fabric controller 222A1 of sender 202A1 is shown as sending data payload 208A1 through its fabric controller 222A1 using a compression scheme A (such as, for example, a large lossless compression scheme or any other compression scheme) at a compression ratio of 50% where the link load between the switch 203 and sender 202A1 is at 20%. The switch 203 then routes the data payload 208A1 in its compressed form to target 202B1 through a link exhibiting a link load of 3%, and through the target fabric controller 222B1, where the target fabric controller 222B1 is experiencing a computational load of 90%. The above scenario however poses the following issues: (1) at a link load of 20% between node 202A1 and switch 203, a high compute compression ratio of 50% would be too aggressive; at a link load of 3% between the switch of target, data payload compression would not be needed; (2) where the fabric controller load on the target side is high (90% here), data payload ingress to decompression within the fabric controller would further add to the fabric controller's latency and degrade quality of service (QoS); and (3) it is possible that the target may not support the compression algorithm used, that is compression scheme A.

Referring still to FIG. 2, sender 202A2 is shown as sending data payloads 208A2 and 208A3 through its fabric controller 222A2 using no compression, where the link load between the switch and sender 202A2 is at 5% for data payload 208A2 and at 6% for data payload 208A3. It is to be noted that the instances of a data payload leaving node 202A2 could be leaving at different times, an important point being that the shown example is to illustrate two scenarios for a data payload leaving node 202A2. After each of data payloads 208A2/208A3 is sent from the fabric controller 222A2 in node 202A2, the switch 203 routes the data payloads 208A2 and 208A3 in their uncompressed forms to target 202B2 and 202B3. The link load at target 202B2 is at 90%, while the link load at target 202B3 is at 4%. The above poses the issue that at a link load of 90% between the switch and target 202132, data payload compression would be needed, but is not being used, potentially leading to a decrease in system performance. The link at target 202B3 is the only one where the data payload, which was never compressed, would not need compression, because the link load at that link is only at 4%.

At least based on the above, embodiments concern addressing among others the following issues: (1) a need to adapt the type of compression algorithm at the sender to the link load at the receiver, even where the link load is defined between the sender and a switch; (2) a need to ensure that the target supports the compression algorithm used at the sender; and/or (3) a need to ensure that the compression algorithm used takes into consideration QoS requirements for the data payload.

Some demonstrative embodiments address the above issues by providing an adaptive compression scheme that allows a determination of whether or not to compress, and of a compression algorithm to be used, based on one or more decompression methods supported at the target, based on link load at the target, and further based on QoS requirements for the data payload. In order to achieve the above, programmable logic, such as in the form of hardware, may be used to implement a variety of compression algorithm with varying properties based at least on the criteria noted above.

Reference is now made to FIG. 3, which depicts an architecture of an Adaptive Compression Device (ACD) of a computing device in a node or a switch, and associated compression kernels and meta data according to some demonstrative embodiments. Aspects of a node or switch according to some demonstrative embodiments other than those related to the ACD may be similar to those described above in relation to FIG. 1.

As shown in FIG. 3, ACD 300 may be part of either a fabric controller 322, such as an HFI 323A within a node 302, or such as the fabric controller 323B of a switch 303, and may comprise processing circuitry including logic. The node and switch could be otherwise similar to the nodes and switch described above in relation to FIG. 1. In the shown illustration of FIG. 3, HFI 322 may include a first node interface 314 to receive a data payload, and a second node interface 316 to transmit the data payload after processing of the data payload through the ACD 300. Switch 303 may in turn include ingress logic 318 on a per node basis to receive and queue a data payload from an associated node, and egress logic 319 to queue the data payload after processing through the ACD 300 for transmission from the switch.

Referring still to FIG. 3, the ACD 300 of a computing device, such as a node or a switch, may program compression kernels in the form of bit-streams that may be adaptively used to compress fabric messages such as data payloads. ACD 300 of various nodes and switches may register compression kernels and associated meta-data describing their computational costs to different domains of the network fabric/datacenter, with registration being exposed only to role with privileges. ACD 300 may include reprogrammable logic in the form of hardware/logic circuitry (hereinafter "reprogrammable logic circuitry" or RLC) such as in a Field Programmable Gate Array (FPGA) 312, and additional logic such as an Adaptive Compression Logic (ACL) circuitry 324 and Load Monitoring Data and Support Methods (LMDSM) circuitry 326 coupled to an FPGA 312 to make possible an implementation of the adaptive compression scheme according to some demonstrative embodiments. The RLC may therefore include new hardware support in a computing device such as a node or a switch that programs or registers compression algorithms as compression algorithm kernels or compression kernels 330 in the form of bit-streams into the RLC as shown. This would allow the computing device to perform compression of data payloads by way of the RLC being instructed to execute one of the registered compression kernels, compression for example being through the use of wide registers, and/or through the use of specialized support for look-up, mask and shuffle. The compression kernels, along with meta-data describing their computational cost, may be registered to the RLC by the system software stack. For example, in the demonstrative embodiment of FIG. 3, compression kernels 330 registered to FPGA 312 as respective bit-streams may include two distinct compression methods/algorithms 012 and 011. Associated meta-data may include the performance efficiency and compression efficiency of such kernels as shown, which, in the illustrated embodiment, include, respectively 1 byte/ns and 70% for compression method 012, and, respectively, 2 bytes/ns and 50% for compression method 011. The performance efficiency and compression efficiency may be dependent not only on the compression algorithm used, but further on data payload to be compressed as would be well known by a person skilled in the art. Thus, the performance and compression efficiencies may vary over time and among workloads, and, therefore, could be constantly updated using weighted means involving statistics from single operations. For example, most recent operations concerning targets might provide a way to estimate how the workload traffic may behave in the future. Compression kernel registration may be effected using multicast messages initiated by one or more nodes or switches within the network fabric, although some peer computing devices within the network may not support all or some of the compression algorithms sought to be registered. Each entity or computing device, such as a node or a switch, is able to register to its peer computing devices supported compression algorithms.

Referring still to FIG. 3, LMDSM circuitry 306 may be coupled to the ACL circuitry 324 and to the FPGA 312, and may serve to obtain static information and dynamic information from one or more targets related to the one or more targets, such as static information related to a target's supported compression methods, or dynamic information including data relating to a target's link load. An example of such information that may be obtained by the LMDSM circuitry 326 is shown in the "Peer Load and Supported Method" table 325, which may be stored in the ACD 300. In the latter shown embodiment, computing devices that include ACD 300 may include two peer nodes, Node 0 and Node 1, respectively having their last known link loads as 80% and 10%. Node 0 is further shown as supporting compression algorithms 012 (involving Golomb compression techniques) and as 011 (involving bit-packing), meaning that Node 0 is able to decompress data payloads compressed according to any of compression algorithms 012 and 011. Node 1 on the other hand is shown as supporting compression algorithm 011 only. Data relating to the payload's QoS requirements may for example include data regarding an overhead tolerated expressed as a maximum number of nanoseconds tolerated per hop in order to ensure QoS is not compromised. ACL 324 may receive this static, dynamic and QoS information and may then use this information in making a decision regarding whether or not to use compression for a data payload to be sent to a target, and if yes, in selecting which compression algorithm among the registered compression algorithms to use. For example, in the shown embodiment, link load at a given target may be used to access a compression decision table 332 which may assign certain target link loads with the compression ratio required. There may exist various compression decision tables within the ACL based on other factors, such as, for example, based on not only link load but also QoS requirements for the data payload to be transmitted. The QoS requirements are specific to the data payload, and may for example be specified for example in a Layer 4 (L4) header of the data payload.

As suggested in FIG. 3, fabric flows may be extended according to some demonstrative embodiments to register compression kernels in various computing devices of the network fabric, and to provide means to send load and compression related runtime data from one computing device to another within the network fabric. Fabric flows may also be extended to register meta-data, such as, for example, in the form of a compression efficiency table as described in relation to FIG. 3 above. In addition, according to some demonstrative embodiments; L4 messages may be extended using two fields: one field to be used by the target to indicate the type of compression scheme if any that was used by the previous sender to compress data; and one field to be used by the sender to specify the type of overhead tolerated by the target (for example, in the form of maximum duration of delay tolerated per hop in ns).

Some demonstrative embodiments also include a new fabric protocol to support the adaptive compression scheme described by way of example above. According to some embodiments, an extension of the L4 header may be used to allow any receiving switch or node to understand the encoding scheme used. A new fabric protocol according to some demonstrative embodiments may involve one or more of: (1) propagating registrations of supported compression algorithms and/or meta-data to some or all switches and nodes participating in the network fabric/datacenter; (2) propagating static information, such as information on data payload decompression supported methods, and dynamic information, such as about link load to some or all switches and nodes participating in the network fabric to allow those switches and nodes that can support adaptive compression algorithms to determine whether to apply compression and what type of compression to apply; (3) applying compression also based on QoS requirements of the data payload; (4) discovering compression algorithms supported by peer computing devices within the network fabric; and/or (5) allowing decompression at a switch between the sender and the target based on link load at the target.

According to some demonstrative embodiments, one or more computing devices, such as nodes or switches, that participate in the path of a data payload from the initial sender (where the data payload is generated) to its ultimate target (where the data payload is fully processed without being sent further through the network fabric connection), may be adapted to determine whether or not to compress or decompress the data payload depending on link load at the next target on the path, and further depending on QoS requirements of the payload. On the other hand, targets may send their link load information, and information regarding compression algorithms they support (i.e. for decompression) to peer computing devices within the network fabric to allow them to use an adaptive compression scheme when sending data payloads to those targets. With respect to QoS requirements, since compression and decompression invariably add latency to data payload communications, some demonstrative embodiments may use compression with data payloads that specify a high priority QoS requirement only where necessary to ensure communication takes effect, and may further determine the compression algorithm to be used based on the QoS requirement of the data payload, for example using a lesser compression ratio where the QoS requirement is of a higher priority. However, data payloads to be sent based on a best effort QoS requirement may more readily or always be compressed since they are less sensitive to latency, and would achieve less bandwidth distortion for any higher priority messages where QoS requirements would need to be enforced.

With respect to decompression, there may be instances according to some demonstrative embodiments where, based on link load between the sender and a target in the form of a switch, a data payload may be compressed between that sender and the switch, whereas no compression may be needed/possible form the switch to a target node that represents the next hop on the path of the data payload. The latter case may happen for example where the target node representing the next hop may not support any compression algorithms, or where a link load at that target node may be idle or low enough to obviate a need for compression.

Devices, systems and method implementing an adaptive compression scheme according to some demonstrative embodiments advantageously allow an adaptation of the network fabric to a dynamicity of a scale-out system by allowing a consideration as to whether compression is needed, and also a consideration of one or more compression algorithms to be used based on link load between the sender and the target at the next data payload hop. The above allows the use of compression where it is really needed, and allows a tailoring of compression level to the extent needed. Existing compression approaches, such as smart Network Interface Controllers (NICs) or such as software based solutions, as described above, consider compression algorithms, but not any that would be based on static and dynamic information related to the target at the next hop, and/or not any that would be based on QoS requirements of the data payload. Advantageously, some demonstrative embodiments allow a registration of various adaptive compression schemes through a propagation of related compression kernels throughout the network fabric/datacenter architecture, with registration able to occur in both fabric controllers such as RIB, and also in switches. In addition, some demonstrative embodiments allow the use of heterogenous computing devices, such as nodes and switches, within a network fabric/datacenter, where some of the computing devices support one or more compression algorithms, and some of them do not, and where computing devices support different combinations of compression algorithms, Additionally, some demonstrative embodiments allow the inclusion of information regarding QoS requirements in the data payloads to be sent within the network fabric, allowing the sender to determine whether or not to compress (for example, high priority data payloads would default to no compression unless absolutely needed, and best efforts data payloads could always be compressed if possible), and the extent of the compression that would not affect QoS. Some algorithms may have high compression efficiency for example, but at the expense of performance. Some demonstrative embodiments therefore provide mechanisms to allow a selection of less intrusive (in terms of performance) compression algorithms where needed therefore improving system utilization.

Figure 4:
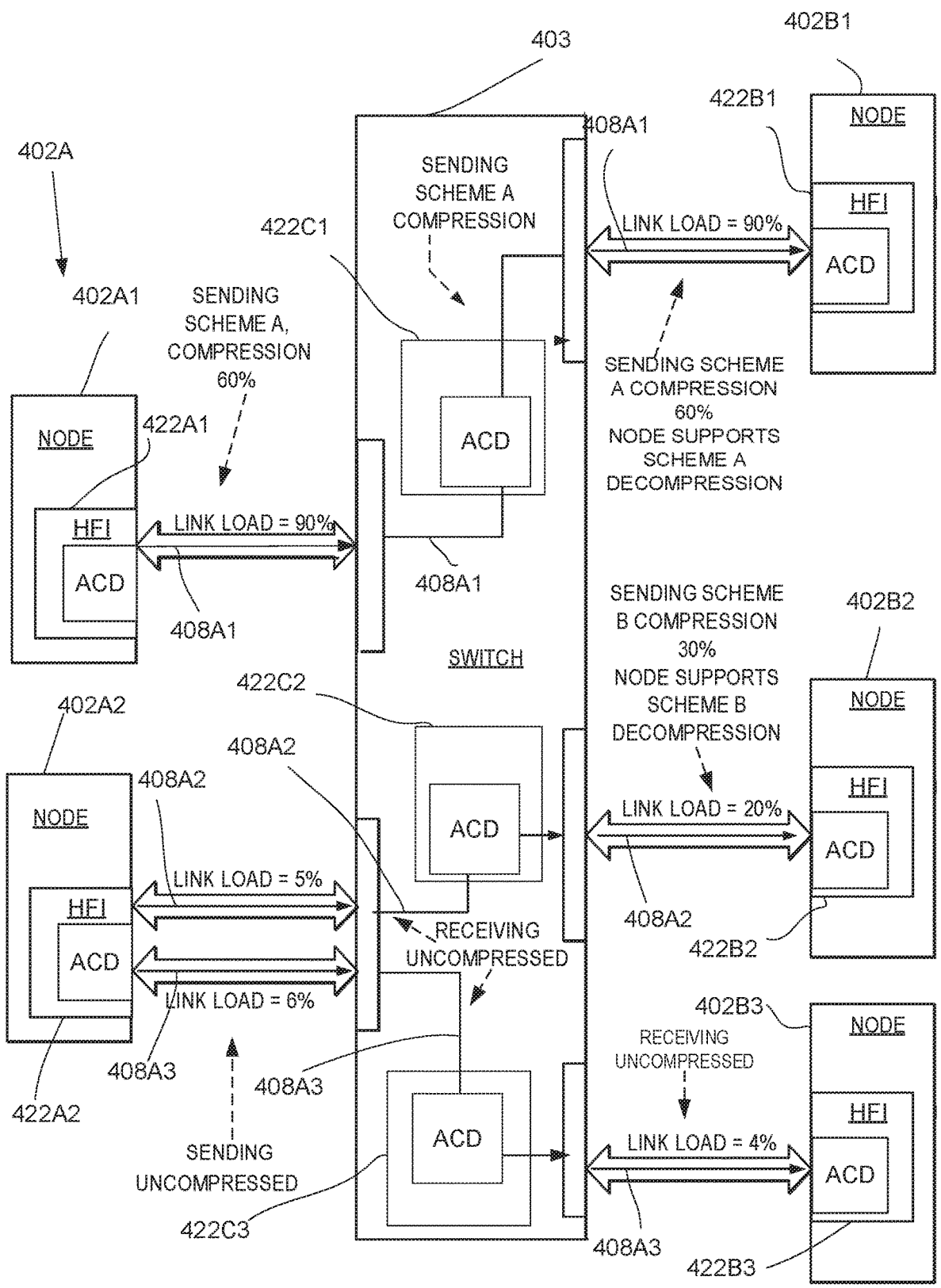
FIG. 4 illustrates a portion of a fabric network similar to FIG. 2, excepts that computing devices shown therein are according to some demonstrative embodiments.

Reference is now made to FIG. 4, which depicts a portion of a network fabric 400 similar to network fabric 100 of FIG. 1 or to network fabric 200 of FIG. 2, except that at least some of the nodes and the switch therein support adaptive compression schemes according to some demonstrative embodiments. Network fabric 400 includes a set of nodes 402A (including nodes 402A1 and 402A2) that are in the process of sending data payloads, a network switch 403 routing the data payloads from nodes/senders 402A to nodes/targets 402B. The nodes, switch and network fabric of FIG. 4 may be similar to the nodes 102, switch 103 and network fabric 100 described above in relation to FIG. 1, but for the support of adaptive compression schemes as noted previously. Each node/sender 402A is shown as having a fabric controller 422A (including 422A1 and 422A2), each node/target 402B is shown as having a fabric controller 422B (including 422B1, 422B2 and 422B3), and the switch is shown as having a fabric controller 422C (including 422C1, 422C2 and 422C3) between each ingress and egress location. Although switch 403 is shown as having a different fabric controller as between each distinct pair of ingress and egress logic, embodiments are not so limited, and include within their scope the use of a single fabric controller or a plurality of fabric controllers within the switch, where the one or more fabric controllers of the switch provide functionality relating to the use of an adaptive compression scheme according to some demonstrative embodiments. The fabric controllers 422A, 422B and 422C in the shown embodiment support adaptive compression schemes according to some demonstrative embodiments, and this is illustrated through the depiction of respective ADC's within each of the fabric controllers shown. The fabric controllers 422A and 422B may, for example, each include a Host Fabric Interface (HH) as shown. The ADC's may for example be similar to the ADC shown by way of example in the embodiment of FIG. 3 described above.

In the shown system, fabric controller 422A1 of sender 402A1 is shown as sending data payload 408A1 through its fabric controller 422A1 using a compression scheme A (such as, for example, a large lossless compression scheme or any other compression scheme) the link load between the sender 402A and the switch 403 may be high enough, such as, for example, 90%, and the QoS requirements of the data payload may exhibit a low enough priority, such as, for example, best efforts, to warrant the use of a compression scheme such as scheme A. The switch 403 then routes the data payload 408A1 in its compressed form to target 402B1 through a link that also exhibits a high enough link load to justify maintaining the compression scheme of the data payload in its path all the way to target 402B1, and through the target fabric controller 422B1, where the data payload could be decompressed.

Referring still to FIG. 4, sender 402A2 is shown as sending data payloads 408A2 and 408A3 through its fabric controller 422A2 using no compression, where the link load between the switch and sender 402A2 is at 5% for data payload 408A2 and at 6% for data payload 408A3. It is to be noted that, similar to FIG. 2, the instances of a data payload leaving node 402A2 could be leaving node 402A2 at different times, an important point being that the shown example is to illustrate two scenarios for a data payload leaving a node. After data payloads 408A2 is sent from the fabric controller 422A2 in node 402A2, the switch 403 routes the data payloads 408A2 to target 402B2, but not before compressing it, for example using a compression scheme B, since a link load between the switch 403 and target 402B2 is at 20%, On the other hand, after data payloads 408A3 is sent from the fabric controller 422A3 in node 402A3, the switch 403 routes the data payloads 408A3 in its uncompressed forms to target 402B3, since a link load between the switch 403 and target 402B3 is only at only 4%, not requiring compression.

In the above scenarios of FIG. 4, according to some demonstrative embodiments: (1) computing devices would have propagated registrations of their respective supported compression algorithms and meta data if any to all switches and nodes participating in the network fabric/data that can support those compression algorithms; (2) computing devices would have further sent static information relating to decompression methods they support to those peer computing devices so that, when they receive a compressed data payload, they are able to decompress it; (3) target devices, such as target devices 402B1, 402B2 and 402B3, and the switch 403, would have sent dynamic information regarding their current link loads to the sender devices 402A and 402B and to switch 403 where appropriate; and/or (4) sender devices 402A1 and 402A2 would have used their respective ACD's in the manner described by way of example with respect to FIG. 3, in order to determine whether or not compression would need to be used, and if yes, to select which compression algorithm (for example, either algorithm 011 or 012 shown in FIG. 3) to use, taking into consideration the static information, the dynamic information and QoS requirements of the data payload.

Referring next to FIGS. 5-8, example fabric flows 500, 600, 700 and 800 for using an adaptive compression scheme according to some demonstrative embodiments. Each flow will be described below. These flows depict example operations that may be performed by any suitable logic, such as one or more components of a fabric controller, similar to fabric controllers shown in FIGS. 3 and 4 above.

Referring first to FIG. 5, an example flow is shown with respect to sending static information from nodes to a switch. In the shown embodiment; Node 1 and Node 2, for example similar to nodes 402A and 402B of FIG. 4, are shown at 540 as sending static information, through their respective node fabric controllers Node 1 HFI and Node 2 HFI, relating to their decompression supported methods and meta-data to a switch (and specifically to a fabric controller of the switch, although not shown), which can be similar to switch 403 of FIG. 4. The switch in turn is shown at 542 as sending ACKs to the respective Node HFIs. The decompression supported methods and meta-data may be used by the ACD in the switch to select what type of compression algorithms to use in sending data payloads to each of Node 1 and Node 2, respectively. In some embodiments, the flow of FIG. 5 is to take place subsequent to registration of compression kernels by Node 1 and Node 2 to the switch.

Referring next to FIG. 6, an example flow is shown with respect to sending static information from a switch to nodes. In the shown embodiment, a switch, for example similar to 403 of FIG. 4, is shown at 640 as sending static information, through its fabric controller (not shown), including information relating to its decompression supported methods and associated meta-data to each of the Node 1 and Node 2, similar to nodes 402A and 402B in FIG. 4 (and specifically to the HFIs of the nodes). The Node HFIs in turn are shown at 642 as sending ACKs to the switch (and specifically to the switch HFI, although not shown). The decompression supported methods and meta-data may be used by the ACD in the respective nodes to select what type of compression algorithms to use in sending data payloads to the switch. In some embodiments, the flow of FIG. 6 is to take place subsequent to registration of compression kernels by Node 1 and Node 2 to the switch.

Figure 7:
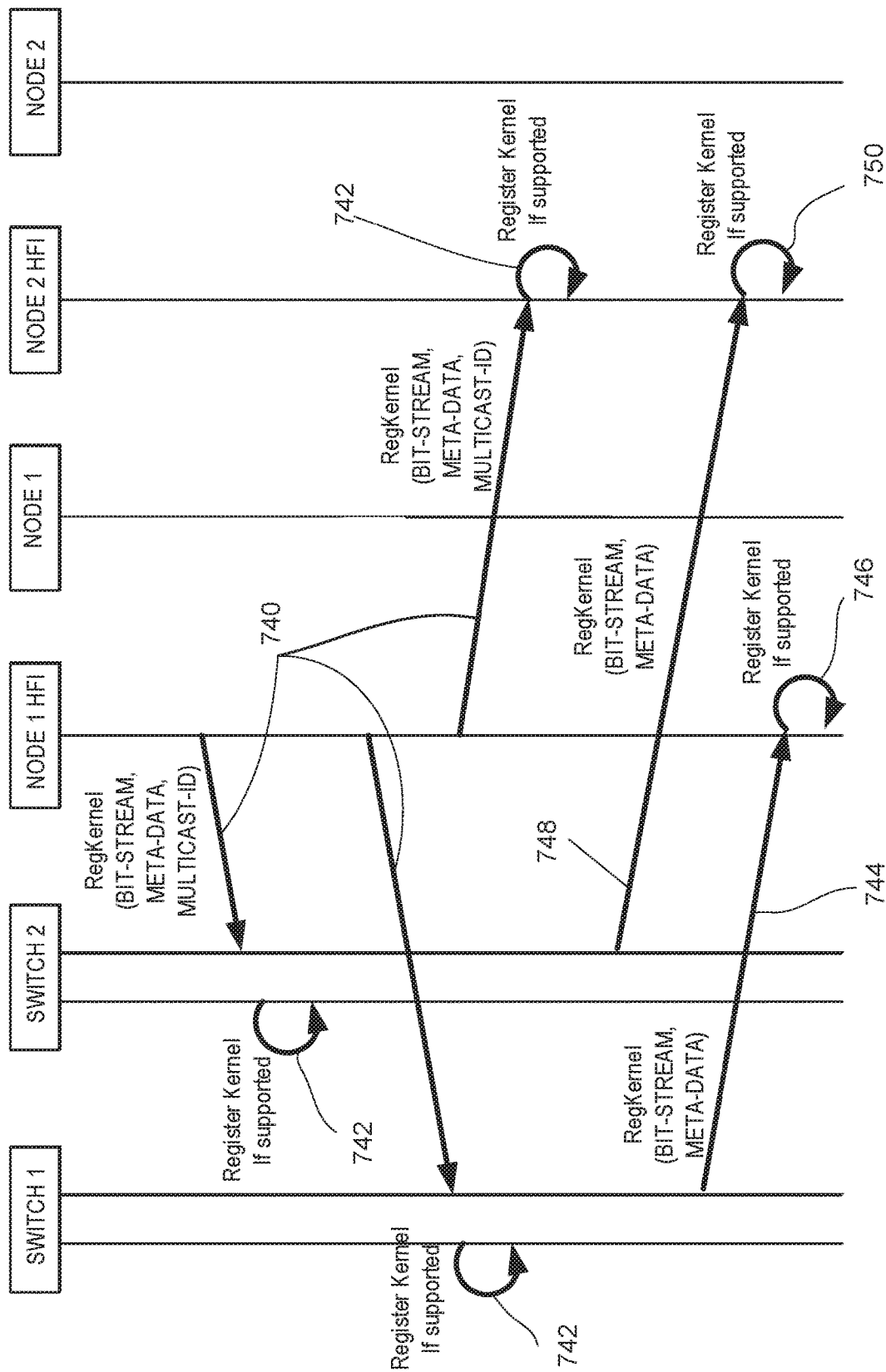
FIG. 7 illustrates an example fabric flow with respect to registering compression kernels and meta data according to some demonstrative embodiments.

Referring next to FIG. 7, an example flow is shown with respect to registering compression algorithm kernels to computing devices such as nodes or switches within a network fabric. In the shown embodiment, Switch 1 and Switch 2 may be similar to switch 403 of FIG. 4, and Node 1 and Node 2 may be similar to nodes 402A and 402B of FIG. 4. In the shown flow of FIG. 7, Node 1, through its HFI Node 1 HFI, is shown at 740 as sending requests to register a compression algorithm kernel to a number of computing devise in the network fabric, including to Switch 1 and Switch 2, and to Node 2. The request comprises a payload that includes a bit stream corresponding to the compression kernel, and associated meta-data, the request being addressed using a multicast ID for the request including the IDs of Switch 1, Switch 2 and Node 2 as targets. Upon reception of the request, each of Switch 1, Switch 2 and Node 2 would then at 742 have their respective ACD's (now shown) program or register the compression kernel into their RLC's (not shown) if those target devices support the kernel sought to be registered. In addition, Switch 1, through its fabric controller (now shown), is shown at 744 as sending requests to register a compression algorithm kernel to Node 1 through Node 1 HFI The request comprises a payload that includes a bit stream corresponding to the compression kernel, and associated meta-data, the request being addressed using a unicast ID for the request including the ID of Node 1 as the target. Upon reception of the request, Node 1 would then at 746 have its ACD (now shown) program or register the compression kernel into its RLC's (not shown) if Node 1 supports the kernel sought to be registered. In addition, Switch 2, through its fabric controller (now shown), is shown at 748 as sending a request to register a compression algorithm kernel to Node 2 through Node 2 HFI. The request comprises a payload that includes a bit stream corresponding to the compression kernel, and associated meta-data, the request being addressed using a unicast ID for the request including the ID of Node 2 as the target. Upon reception of the request, Node 2 would then at 750 have its ACD (now shown) program or register the compression kernel into its RLC's (not shown) if Node 2 supports the kernel sought to be registered. A flow similar to that of FIG. 7 may be executed to register meta-data associated with a compression device (such as, for example, the load to compression table of FIG. 3). However, in some embodiments, meta-data may be registered to the device only once, as opposed to a need to register a plurality of different bit streams for the compression kernels. The flow of FIG. 7 may take place prior to the flows of FIG. 5 or 6.

Figure 8:
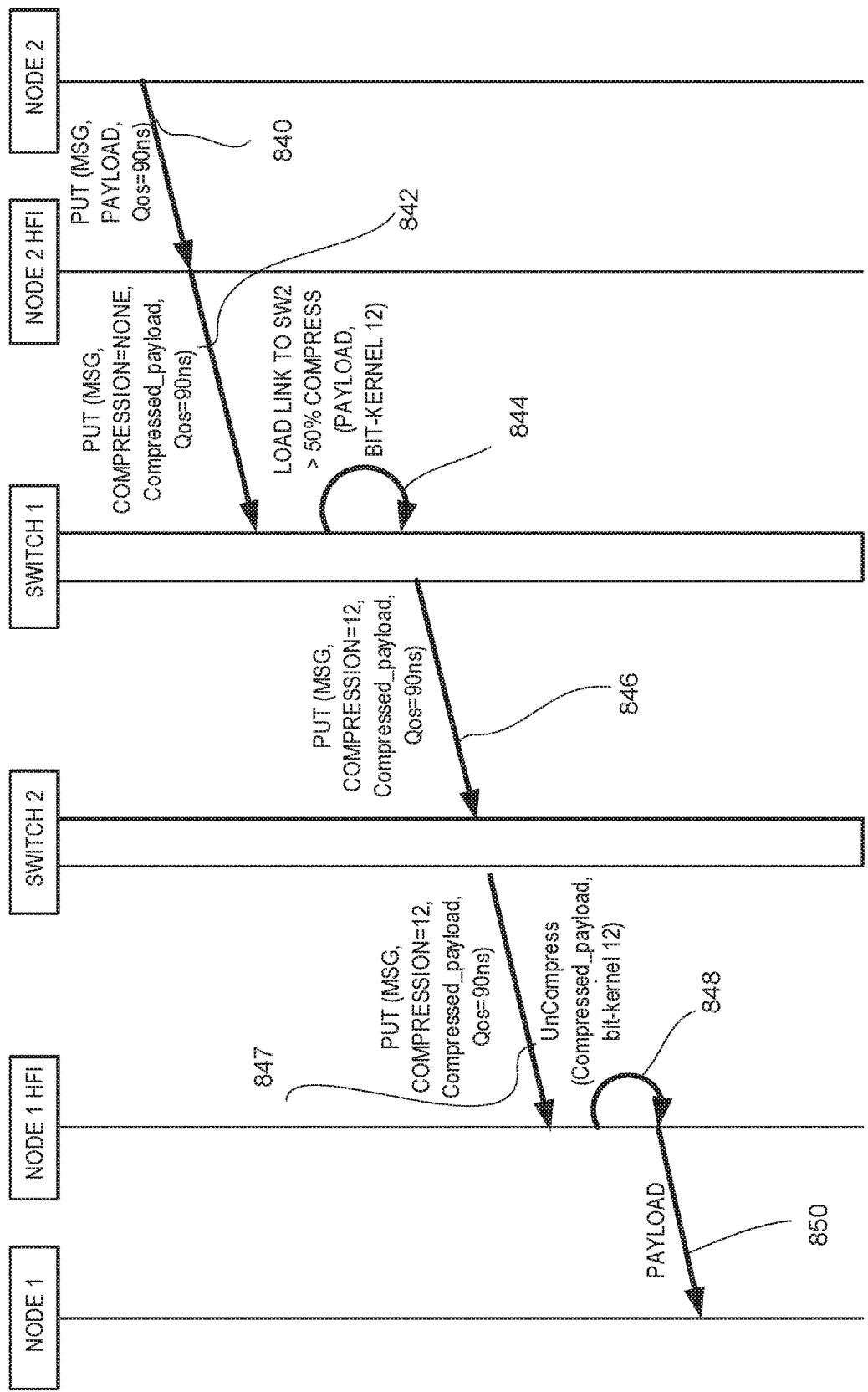
FIG. 8 illustrates an example fabric flow with respect to sending a data payload from one node to another through two switches according to some demonstrative embodiments.

Referring next to FIG. 8, an example flow is shown with respect to sending a data payload from Node 2 to Node 1 through Switch 1 and Switch 2 in a network fabric. In the shown embodiment, Switch 1 and Switch 2 may be similar to switch 403 of FIG. 4, and Node 1 and Node 2 may be similar to nodes 402A and 402B of FIG. 4. In the shown flow of FIG. 8, Node 2 is shown at 840 as sending a data payload to its Node 2 HFI, the data payload including a QoS hint in the form of the number of nanoseconds (in this case 90) of overhead that the data payload could be tolerated for based on its QoS requirements. In some embodiments, the flow of FIG. 8 may take place after the flows of FIGS. 5, 6 and 7. Node 2 HFI then proceeds at 842 to send the data payload in a decompressed format to Switch 1, the load between Node 2 HFI and Switch 1 not being high enough to justify compression. Switch 1 then executes its own compression kernel 012 (see for example FIG. 3) at 844 to compress the data payload since its load link with Switch 2 is at above 50%, and proceeds to send that data payload, in its compressed form at 846 to Switch 2. Switch 2 proceeds at 847 to send the data payload, still compressed, to Node 1 HFI, which proceeds at 848 to decompress the data payload and relay the same to Node 1 at 850. The flow of FIG. 8 may take place after the flows of FIGS. 5-7.

Figure 9:
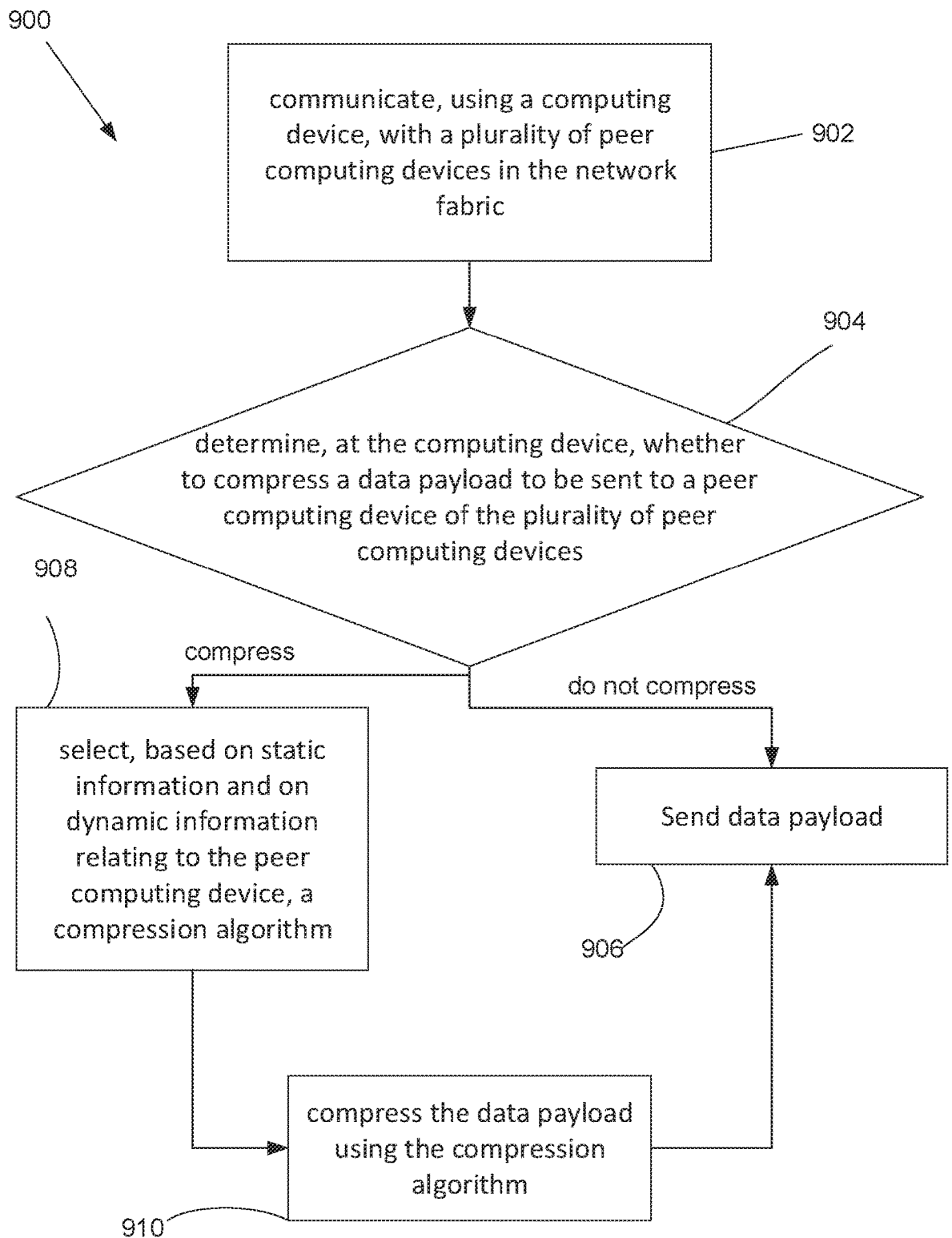
FIG. 9 illustrates an example fabric flow with respect to compressing according to some demonstrative embodiments.

Referring next to FIG. 9, an example fabric flow is illustrated for a method according to some demonstrative embodiments. As seen in FIG. 9, a fabric flow 900 includes, at 902, communicating, using a computing device, with a plurality of peer computing devices in the network fabric. At 904, the fabric flow includes determining, at the computing device, whether to compress a data payload to be sent to a peer computing device of the plurality of peer computing devices. If compression is not to occur (because no compression is needed, or because the payload is already compressed according to the desired compression ratio), at 906, the flow includes sending the data payload. If compression is to occur, the fabric flow includes at 908, selecting, based on static information and on dynamic information relating to the peer computing device, a compression algorithm. The compression algorithm including compression ratio to be used may depend on link load and on payload size, and each link load and payload size may be associated with a range of compression ratios configured e.g., at boot time. After selecting, the fabric flow includes at 910 compressing the data payload using the compression algorithm. Thereafter, after compressing, the fabric flow includes at 906 sending the data payload. If the data payload came to the computing device already compressed, the computing device may (not shown) first decompress the same prior to applying compression onto it based on the compression algorithm. A decision regarding whether or not to compress, and regarding which compression algorithm is to be used, may depend on QoS requirements of the data payload, where an overhead associated with compressing and decompressing the payload ought to be less than the overhead tolerated for that specific payload based on QoS requirements of the same.

The flows described in the above FIGS. 5-9 are merely representative of operations or communications that may occur in particular embodiments. In other embodiments, additional operations may be performed or additional communications sent among the components of a network fabric according to embodiments. Various embodiments of the present disclosure contemplate any suitable signaling mechanisms for accomplishing the functions described herein. Some of the communications or other operations illustrated in FIGS. 3-5 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, non-transitory, machine-readable medium, at least temporarily, an article, such as information encoded into a transitory medium, e.g., a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as network fabric connections, processors, memory devices, cored, FPGAs, memory controllers, intra-node communication controllers, fabric controller, fabric interface controller, or other entity described herein. "Logic" may refer to hardware, firmware, software and/or combinations of each to perform one or more functions. In various embodiments, logic may include a microprocessor or other processing element operable to execute software instructions, discrete logic such as an application specific integrated circuit ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus; logic, hardware; and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES

The following examples pertain to further embodiments.

Example 1 pertain to computing device to be used as part of a network fabric and including: a memory device; and a fabric controller coupled to the memory device, the fabric controller including processing circuitry having logic to communicate with a plurality of peer computing devices in the network fabric. The logic is further to implement an adaptive compression scheme to: select, based on static information and on dynamic information relating to a peer computing device of the plurality of peer computing devices, a compression algorithm to compress a data payload destined for the peer computing device; compress the data payload based on the compression algorithm; and send the data payload to the peer computing device after compressing.

Example 2 includes the subject matter of Example 1, and optionally, wherein the static information includes information on data payload decompression supported methods of the peer computing device, and wherein the dynamic information includes information on link load at the peer computing device.

Example 3 includes the subject matter of Example 1, and optionally, wherein the logic is to compress the data payload further based on meta data associated with the compression algorithm.

Example 4 includes the subject matter of Example 2, and optionally, wherein the logic is to determine or select based on Quality of Service (QoS) requirements of the data payload.

Example 5 includes the subject matter of Example 1, wherein the fabric controller includes reprogrammable logic circuitry, and wherein the logic is further to: program the reprogrammable logic circuitry with compression algorithm kernels through a request to program by at least some of the peer computing devices of the plurality of peer computing devices, the kernels relating to respective ones of the at least some of the peer computing devices; receive, from the at least some of the peer computing devices, static information related to the at least some of the peer computing devices; store the static information related to the at least some of the peer computing devices; receive, from the at least some of the peer computing devices, dynamic information related to the at least some of the peer computing devices; and compress data payloads to be sent to respective ones of the at least some of the peer computing devices based on the static information and the dynamic information related thereto.

Example 6 includes the subject matter of Example 5, and optionally, wherein: the static information related to the at least some of the computing devices includes information on decompression supported methods at each of the at least some of the peer computing devices; and the dynamic information related to the at least some of the computing devices includes information on link load at each of the at least some of the peer computing devices.

Example 7 includes the subject matter of Example 5, and optionally, wherein the fabric controller further includes an adaptive compression device and a load monitoring and support methods circuitry both coupled to the reprogrammable logic circuitry, wherein: the adaptive compression device is to program the reprogrammable logic circuitry; and the load monitoring and support methods circuitry is to receive the static information and the dynamic information related to the at least some of the peer computing devices.

Example 8 includes the subject matter of Example 1, and optionally, wherein: the computing device is a node of the network fabric; and the fabric controller is a host fabric interface (HFI).

Example 9 includes the subject matter of Example 1, and optionally, wherein the computing device is a switch, the peer computing device is a first peer computing device, and the data payload is a first data payload, and wherein the logic is further to: receive a second data payload in a compressed form; decompress the second data payload based on a decompression method supported at the switch, and if a link between the switch and the second peer computing device is idle, or if the second peer computing device is unable to decompress the first data payload; and send the second data payload to a second peer computing device within the network fabric after decompressing.

Example 10 includes a method to process a data payload in a network fabric, the method including: communicating, using a computing device, with a plurality of peer computing devices in the network fabric; determining, at the computing device, whether to compress a data payload to be sent to a peer computing device of the plurality of peer computing devices. If compressing, the method further includes: selecting; based on static information and on dynamic information relating to the peer computing device, a compression algorithm; compressing the data payload using the compression algorithm; and sending the data payload to the peer computing device after compressing.

Example 11 includes the subject matter of Example 10, and optionally, wherein the static information includes information on data payload decompression supported methods of the peer computing device, and wherein the dynamic information includes information on link load at the peer computing device.

Example 12 includes the subject matter of Example 10, and optionally, wherein compressing is further based on meta data associated with the compression algorithm.

Example 13 includes the subject matter of Example 10, and optionally, wherein determining or selecting are based on Quality of Service (QoS) requirements of the data payload.

Example 14 includes the subject matter of Example 10, and optionally, wherein the computing device includes a fabric controller including reprogrammable logic circuitry, the method further including: programming the reprogrammable logic circuitry with compression algorithm kernels through a request to program by at least some of the peer computing devices of the plurality of peer computing devices, the kernels relating to respective ones of the at least some of the peer computing devices; receiving, from the at least some of the peer computing devices, static information related to the at least some of the peer computing devices; storing the static information related to the at least some of the peer computing devices; receiving; from the at least some of the peer computing devices, dynamic information related to the at least some of the peer computing devices; compressing data payloads to be sent to respective ones of the at least some of the peer computing devices based on the static information and the dynamic information related thereto; sending the data payloads.

Example 15 includes the subject matter of Example 14, and optionally, further including: using an adaptive compression device of the fabric controller to program the reprogrammable logic circuitry; and using a load monitoring and support methods circuitry of the fabric controller to receive the static information and the dynamic information related to the at least some of the peer computing devices.

Example 16 includes the subject matter of Example 14, and optionally, wherein: the computing device is a node of the network fabric; and the fabric controller is a host fabric interface (HFI).

Example 17 includes the subject matter of Example 10, and optionally, wherein the computing device is a switch, the peer computing device is a first peer computing device, and the data payload is a first data payload, the method further comprising: receiving a second data payload in a compressed form; decompressing the second data payload based on a decompression method supported at the switch and if a link between the switch and the second peer computing device is idle, or if the second peer computing device is unable to decompress the first data payload; and sending the second data payload to a second peer computing device within the network fabric after decompressing.

Example 18 includes a product comprising one or more tangible computer-readable non-transitory storage media comprising computer-executable instructions operable to, when executed by at least one computer processor of a computing device, cause the computing device to implement operations including: communicating with a plurality of peer computing devices in the network fabric; determining whether to compress a data payload to be sent to a peer computing device of the plurality of peer computing devices. If compressing, the operations further include: selecting; based on static information and on dynamic information relating to the peer computing device, a compression algorithm; compressing the data payload using the compression algorithm; and sending the data payload to the peer computing device after compressing.

Example 19 includes the subject matter of Example 18, and optionally, wherein the static information includes information on data payload decompression supported methods of the peer computing device, and wherein the dynamic information includes information on link load at the peer computing device.

Example 20 includes the subject flatter of Example 18, and optionally, wherein the operations further include compressing based on meta data associated with the compression algorithm.

Example 21 includes the subject matter of Example 18, and optionally, wherein determining or selecting are based on information on Quality of Service (QoS) requirements of the data payload.

Example 22 includes the subject matter f Example 18, and optionally, wherein the computing device includes a fabric controller including reprogrammable logic circuitry, the operations further including: programming the reprogrammable logic circuitry with compression algorithm kernels through a request to program by at least some of the peer computing devices of the plurality of peer computing devices, the kernels relating to respective ones of the at least some of the peer computing devices; receiving, from the at least some of the peer computing devices, static information related to the at least some of the peer computing devices; storing the static information related to the at least some of the peer computing devices; receiving, from the at least some of the peer computing devices, dynamic information related to the at least some of the peer computing devices; compressing data payloads to be sent to respective ones of the at least some of the peer computing devices based on the static information and the dynamic information related thereto; sending the data payloads.

Example 23 includes the subject matter of Example 22, and optionally, wherein the operations further include: using an adaptive compression device of the fabric controller to program the reprogrammable logic circuitry; and using a load monitoring and support methods circuitry of the fabric controller to receive the static information and the dynamic information related to the at least some of the peer computing devices.

Example 24 includes the subject matter of Example 18, and optionally, wherein: the computing device is a node of the network fabric; and the fabric controller is a host fabric interface (HFI).

Example 25 includes the subject matter of Example 22, and optionally, wherein the computing device is a switch, the peer computing device is a first peer computing device, and the data payload is a first data payload, the method further comprising: receiving a second data payload in a compressed form; decompressing the second data payload based on a decompression method supported at the switch and if a link between the switch and the second peer computing device is idle, or if the second peer computing device is unable to decompress the data payload; and sending the second data payload to a second peer computing device within the network fabric after decompressing.

Example 26 includes a computing device within a network fabric, the computing device including: memory device; and a fabric controller including processing circuitry having logic to communicate with peer computing devices within the network fabric, the logic further to: register, to at least some of the peer computing devices, a compression kernel including bit-stream corresponding to a compression algorithm to be used on data payloads to be sent to the computing device; send, to the one or more peer computing devices, static information related to the computing device; send, to the one or more peer computing devices, dynamic information related to the computing device; receive from one of the peer entities a data payload compressed according to the compression algorithm; and process the data payload.

Example 27 includes the subject matter of Example 26, and optionally, wherein the logic is to process the data payload by at least one of decompressing the data payload or sending the data payload, in its compressed or decompressed form, to another peer entity.

Example 28 includes the subject matter of Example 26, and optionally, wherein the static information includes information on data payload decompression supported methods at the computing device, and wherein the dynamic information includes information on link load at the computing device.

Example 29 includes the subject matter of Example 26, and optionally, wherein the logic is to: register, to at least some of the peer computing devices, meta data associated with the compression kernel; and receive a data payload compressed using the meta data.

Example 30 includes the subject matter of Example 26, and optionally, wherein the fabric controller includes reprogrammable logic circuitry, and wherein the logic is further to: program the reprogrammable logic circuitry with compression algorithm kernels through a request to program by at least a subset of the peer computing devices of the plurality of peer computing devices, the kernels relating to respective ones of the at least the subset of the peer computing devices; receive, from the at least the subset of the peer computing devices, static information related to the at least the subset of the peer computing devices; store the static information related to the at least the subset of the peer computing devices; receive, from the at least the subset of the peer computing devices, dynamic information related to the at least the subset of the peer computing devices; compress data payloads to be sent to respective ones of the at least the subset of the peer computing devices based on the static information and the dynamic information related thereto.

Example 31 includes the subject matter of Example 30, and optionally, wherein: the static information related to the at least the subset of the peer computing devices includes information on decompression supported methods at each of the at least the subject of the peer computing devices; and the dynamic information related to the at least the subset of the computing devices includes information on link load at each of the at least the subset of the peer computing devices.

Example 32 includes the subject matter of Example 30, and optionally, wherein the fabric controller further includes an adaptive compression device and a load monitoring and support methods circuitry both coupled to the reprogrammable logic circuitry, wherein: the adaptive compression device is to program the reprogrammable logic circuitry; and the load monitoring and support methods circuitry is to receive the static information and the dynamic information related to the at least the subset of the peer computing devices.

Example 33 includes the subject matter of Example 26, and optionally, wherein: the computing device is a node of the network fabric; and the fabric controller is a host fabric interface (HFI).

Example 34 includes the subject matter of Example 26, and optionally, wherein the computing device is a switch, and the logic is further to: receive a data payload in a compressed form; decompress the received data payload based on a decompression method supported at the switch if a link between the switch and the second peer computing device is idle, or if the second peer computing device is unable to decompress the data payload; and send the received data payload to a peer computing device within the network fabric after decompressing.

Example 35 includes a method to process data in a network fabric, the method including: registering, to at least some of the peer computing devices, a compression kernel including bit-stream corresponding to a compression algorithm to be used on data payloads to be sent to the computing device; sending, to the one or more peer computing devices, static information related to the computing device; sending, to the one or more peer computing devices, dynamic information related to the computing device; receiving from one of the peer entities a data payload compressed according to the compression algorithm; and processing the data payload.

Example 36 includes the subject matter of Example 35, and optionally, wherein processing the data payload includes at least one of decompressing the data payload or sending the data payload, in its compressed or decompressed form, to another peer entity.

Example 37 includes the subject matter of Example 35, and optionally, wherein the static information includes information on data payload decompression supported methods of the peer computing device, and wherein the dynamic information includes information on link load at the peer computing device.

Example 38 includes the subject matter of Example 35, and optionally, wherein registering further includes registering meta data associated with the compression kernel to the at least some of the peer computing devices.

Example 39 includes the subject matter of Example 35, and optionally, wherein the computing device includes a fabric controller including reprogrammable logic circuitry, the method further including: programming the reprogrammable logic circuitry with compression algorithm kernels through a request to program by at least a subset of the peer computing devices of the plurality of peer computing devices, the kernels relating to respective ones of the at least the subset of the peer computing devices; receiving, from the at least the subset of the peer computing devices, static information related to the at least the subset of the peer computing devices; storing the static information related to the at least the subset of the peer computing devices; receiving, from the at least the subset of the peer computing devices, dynamic information related to the at least the subset of the peer computing devices; compressing data payloads to be sent to respective ones of the at least the subset of the peer computing devices based on the static information and the dynamic information related thereto; sending the data payloads.

Example 40 includes the subject matter of Example 39, and optionally, further including: using an adaptive compression device of the fabric controller to program the reprogrammable logic circuitry; and using a load monitoring and support methods circuitry of the fabric controller to receive the static information and the dynamic information related to the at least the subset of the peer computing devices.

Example 41 includes the subject matter of Example 39, and optionally, wherein: the computing device is a node of the network fabric; and the fabric controller is a host fabric interface (FIFO.

Example 42 includes the subject matter of Example 35, and optionally, wherein the computing device is a switch, the method further comprising: receiving a data payload in a compressed form; decompressing the received data payload based on a decompression method supported at the switch if a link between the switch and the second peer computing device is idle, or if the second peer computing device is unable to decompress the data payload; and sending the received data payload to a peer computing device within the network fabric after decompressing.

Example 43 includes a product comprising one or more tangible computer-readable non-transitory storage media comprising computer-executable instructions operable to, when executed by at least one computer processor of a computing device; cause the computing device to implement operations including: registering, to at least some of the peer computing devices, a compression kernel including bit-stream corresponding to a compression algorithm to be used on data payloads to be sent to the computing device; sending, to the one or more peer computing devices, static information related to the computing device; sending, to the one or more peer computing devices, dynamic information related to the computing device; receiving from one of the peer entities a data payload compressed according to the compression algorithm; and processing the data payload.

Example 44 includes the subject matter of Example 43, and optionally, wherein the static information includes information on data payload decompression supported methods of the peer computing device, and wherein the dynamic information includes information on link load at the peer computing device.

Example 45 includes the subject matter of Example 43, and optionally, wherein the operations further include registering meta data associated with the compression kernel to the at least some of the peer computing devices.

Example 46 includes the subject matter of Example 43, and optionally, wherein the computing device includes a fabric controller including reprogrammable logic circuitry, the operations further including: programming the reprogrammable logic circuitry with compression algorithm kernels through a request to program by at least a subset of the peer computing devices of the plurality of peer computing devices, the kernels relating to respective ones of the at least a subset of the peer computing devices; receiving, from the at least a subset of the peer computing devices, static information related to the at least a subset of the peer computing devices; storing the static information related to the at least a subset of the peer computing devices; receiving, from the at least a subset of the peer computing devices, dynamic information related to the at least a subset of the peer computing devices; compressing data payloads to be sent to respective ones of the at least a subset of the peer computing devices based on the static information and the dynamic information related thereto; sending the data payloads.

Example 47 includes the subject matter of Example 45, and optionally, wherein the operations further include: using an adaptive compression device of the fabric controller to program the reprogrammable logic circuitry; and using a load monitoring and support methods circuitry of the fabric controller to receive the static information and the dynamic information related to the at least a subset of the peer computing devices.

Example 48 includes the subject matter of Example 46, and optionally, wherein: the computing device is a node of the network fabric; and the fabric controller is a host fabric interface (HFI).

Example 49 includes the subject matter of Example 43, and optionally, wherein the computing device is a switch, the operations further comprising: receiving a data payload in a compressed form; decompressing the received data payload based on a decompression method supported at the switch;

and sending the received data payload to a peer computing device within the network fabric after decompressing.

Example 50 includes the subject matter of Example 49, and optionally, wherein decompressing includes decompressing if a link between the switch and the second peer computing device is idle, or if the second peer computing device is unable to decompress the data payload.

Example 51 includes a system comprising: a first computing device; and a second computing device connected to the first computing device through a network fabric. The first computing device comprises a first fabric controller to: register, to the second computing device, a compression kernel including bit-stream corresponding to a compression algorithm to be used on data payloads to be sent by the second computing device to the first computing device; send, to the first computing device, static information related to the first computing device; send, to the second computing device, dynamic information related to the first computing device; receive from the second computing device, a data payload compressed according to the compression algorithm; and process the data payload. The second computing device includes a second fabric controller to: determine whether to compress the data payload to be sent to the first computing device. If compressing: execute the compression kernel registered thereto to compress the data payload using the compression algorithm; and send the data payload to the first computing device after compressing.

Example 52 includes the subject matter of Example 51, and optionally, wherein the static information includes information on data payload decompression supported methods of the first computing device, and wherein the dynamic information includes information on link load at the first computing device.

Example 53 includes the subject matter of Example 52, and optionally, wherein the second fabric controller is to determine or execute based on Quality of Service (QoS) requirements of the data payload.

Example 54 includes the subject matter of Example 51, and optionally, further comprising one or more of: a battery communicatively coupled to the first computing device and the second computing device; or a display communicatively coupled to the first computing device and the second computing device.

Example 55 includes the subject matter of Example 51, and optionally, wherein: the first computing device is one of a node or a switch; and the second computing device is one of a node or a switch.

Example 56 includes a computing device to be used as part of a network fabric and including: means for registering, to at least some of the peer computing devices, a compression kernel including bit-stream corresponding to a compression algorithm to be used on data payloads to be sent to the computing device; means for sending, to the one or more peer computing devices, static information related to the computing device; means for sending, to the one or more peer computing devices, dynamic information related to the computing device; means for receiving from one of the peer entities a data payload compressed according to the compression algorithm; and means for processing the data payload.

Example 57 includes the subject matter of Example 56, and optionally, wherein the means for processing the data payload includes means for at least one of decompressing the data payload or sending the data payload, in its compressed or decompressed form, to another peer entity.

Example 58 includes the subject matter of Example 56, and optionally, wherein the static information includes information on data payload decompression supported methods of the peer computing device, and wherein the dynamic information includes information on link load at the peer computing device.

Example 59 includes the subject matter of Example 56, and optionally, wherein the means for registering further includes means for registering meta data associated with the compression kernel to the at least some of the peer computing devices.

Example 60 includes the subject matter of Example 56, and optionally, further including a fabric controller comprising reprogrammable logic circuitry, the method device further including: means for programming the reprogrammable logic circuitry with compression algorithm kernels through a request to program by at least a subset of the peer computing devices of the plurality of peer computing devices, the kernels relating to respective ones of the at least the subset of the peer computing devices; means for receiving, from the at least the subset of the peer computing devices, static information related to the at least the subset of the peer computing devices; means for storing the static information related to the at least the subset of the peer computing devices; means for receiving, from the at least the subset of the peer computing devices, dynamic information related to the at least the subset of the peer computing devices; means for compressing data payloads to be sent to respective ones of the at least the subset of the peer computing devices based on the static information and the dynamic information related thereto; means for sending the data payloads.

Example 61 includes the subject matter of Example 60, and optionally, further including: means for programming the reprogrammable logic circuitry; and means for receiving the static information and the dynamic information related to the at least the subset of the peer computing devices.

Example 62 includes the subject matter of Example of 56, and optionally, further comprising: means for receiving a data payload in a compressed form; means for decompressing the received data payload based on a decompression method supported at the switch if a link between the switch and the second peer computing device is idle, or if the second peer computing device is unable to decompress the data payload; and means for sending the received data payload to a peer computing device within the network fabric after decompressing.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A computing device to be used as part of a network fabric and including:
   a memory device; and
   a fabric controller coupled to the memory device, the fabric controller including processing circuitry having logic to communicate with a plurality of peer computing devices in the network fabric, the logic further to implement an adaptive compression scheme to:
   select, based on static information and on dynamic information relating to a peer computing device of the plurality of peer computing devices, a compression algorithm to compress a data payload destined for the peer computing device;
   compress the data payload based on the compression algorithm; and
   send the data payload to the peer computing device after compressing.

2. The computing device of claim 1, wherein the static information includes information on data payload decompression supported methods of the peer computing device, and wherein the dynamic information includes information on link load at the peer computing device.

3. The computing device of claim 1, wherein the logic is to compress the data payload further based on meta data associated with the compression algorithm.

4. The computing device of claim 2, wherein the logic is to determine or select based on Quality of Service (QoS) requirements of the data payload.

5. The computing device of claim 1, wherein the fabric controller includes programmable logic circuitry, and wherein the logic is further to:
   program the reprogrammable logic circuitry with compression algorithm kernels through a request to program by at least some of the peer computing devices of the plurality of peer computing devices, the kernels relating to respective ones of the at least some of the peer computing devices;
   receive, from the at least some of the peer computing devices, static information related to the at least some of the peer computing devices;
   store the static information related to the at least some of the peer computing devices;
   receive, from the at least some of the peer computing devices, dynamic information related to the at least some of the peer computing devices;
   compress data payloads to be sent to respective ones of the at least some of the peer computing devices based on the static information and the dynamic information related thereto.

6. The computing device of claim 5, wherein:
   the static information related to the at least some of the computing devices includes information on decompression supported methods at each of the at least some of the peer computing devices; and
   the dynamic information related to the at least some of the computing devices includes information on link load at each of the at least some of the peer computing devices.

7. The computing device of claim 5, wherein the fabric controller further includes an adaptive compression device and a load monitoring and support methods circuitry both coupled to the reprogrammable logic circuitry, wherein:
   the adaptive compression device is to program the reprogrammable logic circuitry; and
   the load monitoring and support methods circuitry is to receive the static information and the dynamic information related to the at least some of the peer computing devices.

8. The computing device of claim 1, wherein:
   the computing device is a node of the network fabric; and
   the fabric controller is a host fabric interface (HFI).

9. The computing device of claim 1, wherein the computing device is a switch, the peer computing device is a first peer computing device, and the data payload is a first data payload, and wherein the logic is further to:
   receive a second data payload in a compressed form;
   decompress the second data payload based on a decompression method supported at the switch, and if a link between the switch and the second peer computing device is idle, or if the second peer computing device is unable to decompress the data payload; and
   send the second data payload to a second peer computing device within the network fabric after decompressing.

10. A method to process a data payload in a network fabric, the method including:
    communicating, using a computing device, with a plurality of peer computing devices in the network fabric;
    determining, at the computing device, whether to compress a data payload to be sent to a peer computing device of the plurality of peer computing devices;
    if compressing:
    selecting, based on static information and on dynamic information relating to the peer computing device, a compression algorithm;
    compressing the data payload using the compression algorithm; and
    sending the data payload to the peer computing device after compressing.

11. The method of claim 10, wherein the static information includes information on data payload decompression supported methods of the peer computing device, and wherein the dynamic information includes information on link load at the peer computing device.

12. The method of claim 10, wherein compressing is further based on meta data associated with the compression algorithm.

13. The method of claim 10, wherein determining or selecting are based on Quality of Service (QoS) requirements of the data payload.

14. The method of claim 10, wherein the computing device includes a fabric controller including reprogrammable logic circuitry, the method further including:
    programming the reprogrammable logic circuitry with compression algorithm kernels through a request to program by at least some of the peer computing devices of the plurality of peer computing devices, the kernels relating to respective ones of the at least some of the peer computing devices;
    receiving, from the at least some of the peer computing devices, static information related to the at least some of the peer computing devices;
    storing the static information related to the at least some of the peer computing devices;
    receiving, from the at least some of the peer computing devices, dynamic information related to the at least some of the peer computing devices;
    compressing data payloads to be sent to respective ones of the at least some of the peer computing devices based on the static information and the dynamic information related thereto;
    sending the data payloads.

15. The method of claim 14, further including:
- using an adaptive compression device of the fabric controller to program the reprogrammable logic circuitry; and
- using a load monitoring and support methods circuitry of the fabric controller to receive the static information and the dynamic information related to the at least some of the peer computing devices.

16. The method of claim 14, wherein:
- the computing device is a node of the network fabric; and
- the fabric controller is a host fabric interface (HFI).

17. The method of claim 10, wherein the computing device is a switch, the peer computing device is a first peer computing device, and the data payload is a first data payload, the method further comprising:
- receiving a second data payload in a compressed form;
- decompressing the second data payload based on a decompression method supported at the switch and if a link between the switch and the second peer computing device is idle, or if the second peer computing device is unable to decompress the data payload; and
- sending the second data payload to a second peer computing device within the network fabric after decompressing.

18. A product comprising one or more tangible computer-readable non-transitory storage media comprising computer-executable instructions operable to, when executed by at least one computer processor of a computing device, cause the computing device to implement operations including:
- communicating, using a computing device, with a plurality of peer computing devices in the network fabric;
- determining, at the computing device, whether to compress a data payload to be sent to a peer computing device of the plurality of peer computing devices;
- if compressing:
  - selecting, based on static information and on dynamic information relating to the peer computing device, a compression algorithm;
  - compressing the data payload using the compression algorithm; and
  - sending the data payload to the peer computing device after compressing.

19. The product of claim 18, wherein the static information includes information on data payload decompression supported methods of the peer computing device, and wherein the dynamic information includes information on link load at the peer computing device.

20. The product of claim 18, wherein the operations further include compressing based on meta data associated with the compression algorithm.

21. The product of claim 18, wherein determining or selecting are based on information on Quality of Service (QoS) requirements of the data payload.

22. The product of claim 18, wherein the computing device includes a fabric controller including reprogrammable logic circuitry, the operations further including:
- programming the reprogrammable logic circuitry with compression algorithm kernels through a request to program by at least some of the peer computing devices of the plurality of peer computing devices, the kernels relating to respective ones of the at least some of the peer computing devices;
- receiving, from the at least some of the peer computing devices, static information related to the at least some of the peer computing devices;
- storing the static information related to the at least some of the peer computing devices;
- receiving, from the at least some of the peer computing devices, dynamic information related to the at least some of the peer computing devices;
- compressing data payloads to be sent to respective ones of the at least some of the peer computing devices based on the static information and the dynamic information related thereto;
- sending the data payloads.

23. The product of claim 22, wherein the operations further include:
- using an adaptive compression device of the fabric controller to program the reprogrammable logic circuitry; and
- using a load monitoring and support methods circuitry of the fabric controller to receive the static information and the dynamic information related to the at least some of the peer computing devices.

24. The product of claim 18, wherein:
- the computing device is a node of the network fabric; and
- the fabric controller is a host fabric interface (HFI).

25. The product of claim 22, wherein the computing device is a switch, the peer computing device is a first peer computing device, and the data payload is a first data payload, the method further comprising:
- receiving a second data payload in a compressed form;
- decompressing the second data payload based on a decompression method supported at the switch and if a link between the switch and the second peer computing device is idle, or if the second peer computing device is unable to decompress the data payload; and
- sending the second data payload to a second peer computing device within the network fabric after decompressing.

* * * * *

UNITED STATES PATENT AND TRADEMARK OFFICE
CERTIFICATE OF CORRECTION

PATENT NO. : 10,728,311 B2
APPLICATION NO. : 15/434726
DATED : July 28, 2020
INVENTOR(S) : Karthik Kumar et al.

Page 1 of 1

It is certified that error appears in the above-identified patent and that said Letters Patent is hereby corrected as shown below:

On the Title Page

In Column 2, under "U.S. Patent Documents", Line 1, delete "5,258,963" and insert -- 5,258,983 --, therefor.

In the Claims

In Column 27, Line 32, in Claim 5, delete "programmable" and insert -- reprogrammable --, therefor.

Signed and Sealed this
Fifteenth Day of September, 2020

Andrei Iancu
*Director of the United States Patent and Trademark Office*